United States Patent [19]

Rains

[11] Patent Number: 5,479,794
[45] Date of Patent: Jan. 2, 1996

[54] WHEEL LOCK DEVICE

[76] Inventor: Terry R. Rains, 498 Se Hankel St., Dallas, Oreg. 97338

[21] Appl. No.: 186,376

[22] Filed: Jan. 25, 1994

[51] Int. Cl.$^6$ ........................................... B62H 5/16
[52] U.S. Cl. ................... 70/226; 70/232; 70/237; 188/4 R; 188/32; 410/19
[58] Field of Search ............... 70/225, 226, 209, 70/232, 18, 259, 260, 228, 237; 188/32, 4 R, 20; 410/2, 3, 9, 19, 20, 30

[56] References Cited

U.S. PATENT DOCUMENTS

| | | | |
|---|---|---|---|
| 1,154,389 | 9/1915 | Fogalsang | 70/209 |
| 1,388,322 | 8/1921 | Branco | 70/18 |
| 1,395,532 | 11/1921 | Tilden | 70/209 |
| 1,658,696 | 2/1928 | Walrath | 70/259 |
| 2,107,331 | 2/1938 | Jandus et al. | 70/260 |
| 2,551,218 | 5/1951 | Menne | 188/32 |
| 2,844,909 | 7/1958 | Perchinsky | 188/32 |
| 3,652,103 | 3/1972 | Higgs | 70/226 X |
| 4,651,849 | 3/1987 | Givati | 70/225 X |
| 5,134,868 | 8/1992 | Bethards | 70/226 X |
| 5,263,553 | 11/1993 | Duncan | 70/226 X |

FOREIGN PATENT DOCUMENTS

| | | | |
|---|---|---|---|
| 107568 | 12/1924 | Switzerland | 70/18 |

*Primary Examiner*—Lloyd A. Gall

[57] ABSTRACT

A wheel lock device including a shoe. The shoe has sides, a top with a central aperture wherethrough a wheel strut may extend. The shoe has a generally planar bottom with an anti-slide portion that precludes the wheel lock device from sliding along the supporting surface. The shoe has dimensions such that a strut-mounted wheel assembly of a vehicle may be enclosed therein. The shoe is separated vertically into two equal hingedly connected parts which allow it to be opened for receiving the wheel assembly, or closed for encasing the wheel assembly, whereby precluding free rotation along the supporting surface. Included is a lock that allows the two parts of the shoe to be releasably secured in the closed position. Locking the two parts prevents removal of the shoe from the wheel assembly. Removably connected to the lock is a key. The key is rotated in the lock by a user for release of the lock to permit the shoe to be opened for removal from the wheel assembly.

6 Claims, 4 Drawing Sheets

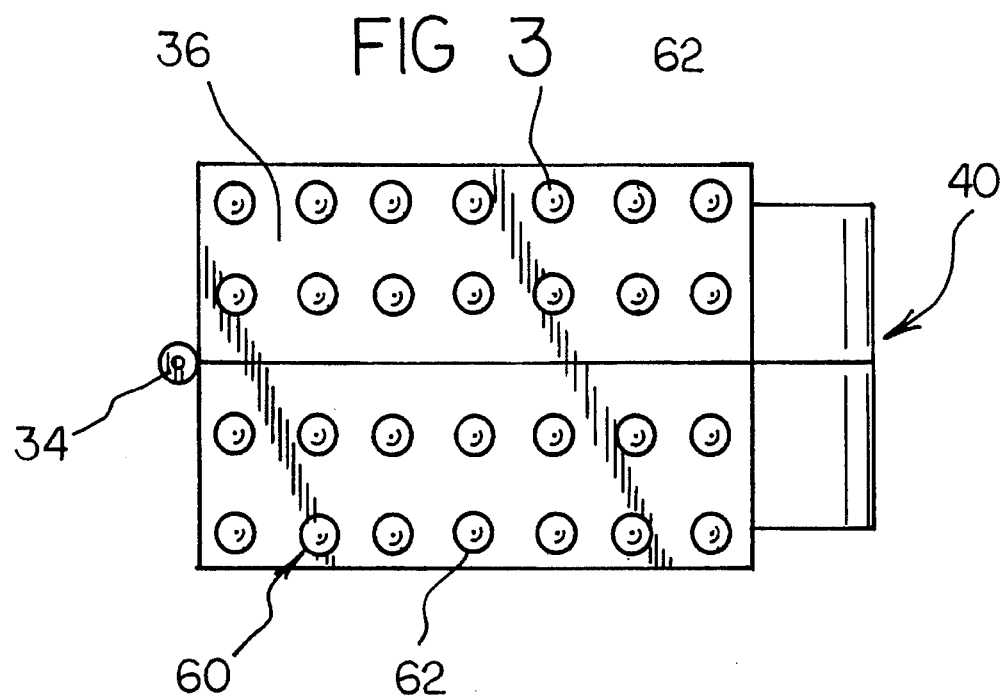
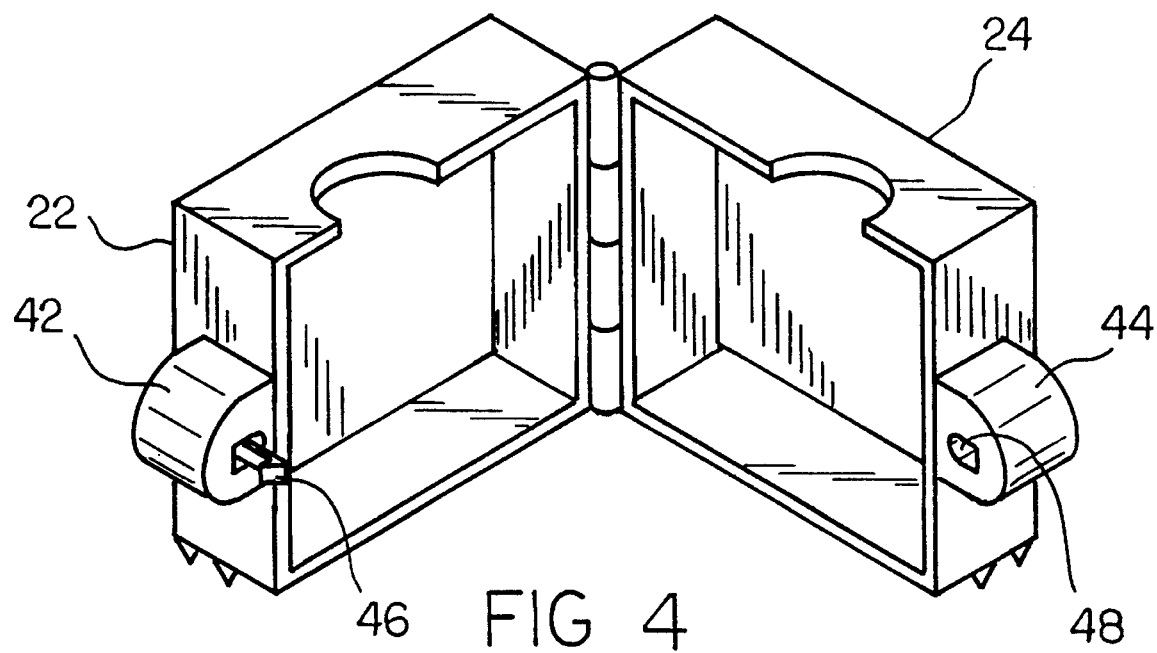

WHEEL LOCK DEVICE

BACKGROUND OF THE INVENTION

1. Field of the Invention

The present invention relates to wheel enclosures and more particularly pertains to wheel enclosures which may be adapted for preventing unauthorized use of vehicles having strut-mounted wheels such as shopping carts, baby strollers, or aircraft.

2. Description of the Prior Art

The use of wheel enclosures is known in the prior art. More specifically, wheel enclosures heretofore devised and utilized for the purpose of covering wheels are known to consist basically of familiar, expected and obvious structural configurations, notwithstanding the myriad of designs encompassed by the crowded prior art which have been developed for the fulfillment of countless objectives and requirements.

The present invention is directed to improving devices for preventing unauthorized use of vehicles having strut-mounted wheels such as shopping carts, baby strollers, or aircraft in a manner which is safe, secure, economical and aesthetically pleasing.

For example, U.S. Pat. No. 3,709,519 to Burrows discloses a protective wheel enclosure for use with a stored vehicle to prevent or restrict damage to a selected wheel set thereof. The enclosure provides a bag-like container to completely enclose the wheels to separate them from the surrounding environment. A pouch of desiccator is incorporated into the interior of the enclosure to effect removal of moisture therefrom.

U.S. Pat. No. 4,993,609 to Flint describes a wheel enclosure for encapsulating a wheel. The enclosure has a cylindrical shape with a cylindrical side wall and circular end enclosures whose inner diameter and inner height are greater than the size of the wheel, thus forming a cavity within which the wheel may be placed. The enclosure is separated into two parts on the cylindrical side wall along an elliptical parting line, including: front and rear container halves. The elliptical parting line of the rear container half forms a mounting shelf upon which the wheel may rest, and also forms a wheel accessible opening in the uppermost cylindrical side wall for easy removal of the wheel.

The prior art also discloses a hinged box as shown in U.S. Pat. No. 3,717,278 to Mari, and a case with a hinged cover as shown in U.S. Pat. No. 4,901,882 to Goncalves.

While these devices fulfill their respective, particular objectives and requirements, the aforementioned patents do not disclose a wheel lock device for preventing unauthorized use of vehicles having strut-mounted wheels such as shopping carts, baby strollers, or aircraft. Furthermore, none of the prior art devices teach or suggest a way to prevent a strut-mounted wheel from rolling across a supporting surface.

In this respect, the wheel lock device according to the present invention substantially departs from the conventional concepts and designs of the prior art, and in so doing provides an apparatus primarily developed for the purpose of preventing unauthorized use of vehicles having strut-mounted wheels such as shopping carts, baby strollers, or aircraft.

Therefore, it can be appreciated that there exists a continuing need for new and improved wheel enclosures which can be used for preventing unauthorized use of vehicles having strut-mounted wheels such as shopping carts, baby strollers, or aircraft. In this regard, the present invention substantially fulfills this need.

As illustrated by the background art, efforts are continuously being made in an attempt to develop wheel enclosures. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of security devices now present in the prior art, the present invention provides an improved wheel enclosure construction wherein the same can be utilized for preventing unauthorized use of vehicles having strut-mounted wheels such as shopping carts, baby strollers, or aircraft. As such, the general purpose of the present invention, which will be described subsequently in greater detail, is to provide a new and improved wheel lock device apparatus and method which has all the advantages of the prior art security devices and none of the disadvantages.

The invention is defined by the appended claims with the specific embodiment shown in the attached drawings. For the purpose of summarizing the invention, the invention may be incorporated into a new and improved wheel lock device for preventing unauthorized use of vehicles having strut-mounted wheels.

The wheel lock device comprises a shoe having sides, a top, and a generally planar bottom. The shoe has dimensions such that a strut-mounted wheel assembly of a vehicle may be enclosed therein. The top has a central aperture wherethrough a wheel strut may extend. The shoe is separated vertically into two equal parts which form complimentary halves of the shoe. The new wheel lock device also has hinge means pivotally connecting the two parts of the shoe along one side whereby the two parts may be aligned in spread apart open relationship for receiving the wheel assembly. The hinge means also allows the two parts of the shoe to be aligned in facing touching closed relationship for encasing the wheel assembly whereby precluding free rotation along a supporting surface.

Locking means, whereby the two parts of the shoe may be releasably secured in the closed position for preventing removal of the shoe from the wheel assembly, is additionally included. The locking means comprises a first housing and a second housing. The housings are integrally formed one on each of the parts of the shoe. The housings are externally formed on the side of the enclosure opposite the hinge. The housings are also in facing touching relationship with each other when the two parts of the shoe are aligned in the closed position. A catch is formed in the first housing wherein a latch may be releasably engaged. A biased latch extends from the second housing and is snapidly releasedly engaged with the catch of the first housing when the two parts of the shoe are aligned in the closed position. The locking means further comprises a key-actuated rotary cam disposed within the second housing. The cam is in cooperative communication with the latch whereby rotation of the cam overcomes the latch bias to retract the latch whereby releasing the latch from engagement with the catch.

The device additionally includes a key removably operationally connected to the rotary cam whereby rotation of the key by a user causes the cam to rotate whereby releasing the locking means to permit the shoe to be opened.

Lastly, the new and improved wheel lock device has anti-slide means for precluding the wheel lock device from sliding along the supporting surface thereby preventing unauthorized use of the vehicle. The anti-slide means comprises a plurality of pointed cleats disposed on the exterior bottom of the shoe, the cleats being in frictional engagement with the supporting surface.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a wheel lock device for preventing unauthorized use of vehicles having strut-mounted wheels such as shopping carts, baby strollers, or aircraft.

It is therefore an additional object of the present invention to provide a new and improved wheel lock device which has all the advantages of the prior art wheel enclosures and none of the disadvantages.

It is another object of the present invention to provide a new and improved wheel lock device which may be easily and efficiently manufactured and marketed.

It is a further object of the present invention to provide a new and improved wheel lock device which is of a durable and reliable construction.

An even further object of the present invention is to provide a new and improved wheel lock device which is susceptible of a low cost of manufacture with regard to both materials and labor, and which accordingly is then susceptible to low prices of sale to the consuming public, thereby making such wheel lock devices economically available to the buying public.

Still yet another object of the present invention is to provide a new and improved wheel lock device which provides in the apparatuses and methods of the prior art some of the advantages thereof, while simultaneously overcoming some of the disadvantages normally associated therewith.

Still yet another object of the present invention is to provide a new and improved wheel lock device that is suitable for manufacture in a variety of different materials, sizes, and shapes for application to a wide range of strut-mounted wheel vehicles.

Yet another object of the present invention is to provide a new and improved wheel lock device that is simple to operate leading to a high probability of it being used routinely and correctly which, in turn will directly result in reduced occurrences of theft or unauthorized use of the vehicles having strut-mounted wheels.

Even still another object of the present invention is to provide a new and improved wheel lock device that has few moving parts leading to improved reliability for enhanced ability to thwart circumvention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a bottom plan view of the invention along line 3—3 of FIG. 2.

FIG. 4 is a perspective view of the invention of FIG. 1 showing it in the open position.

DESCRIPTION OF THE PREFERRED EMBODIMENT

Figure 1:
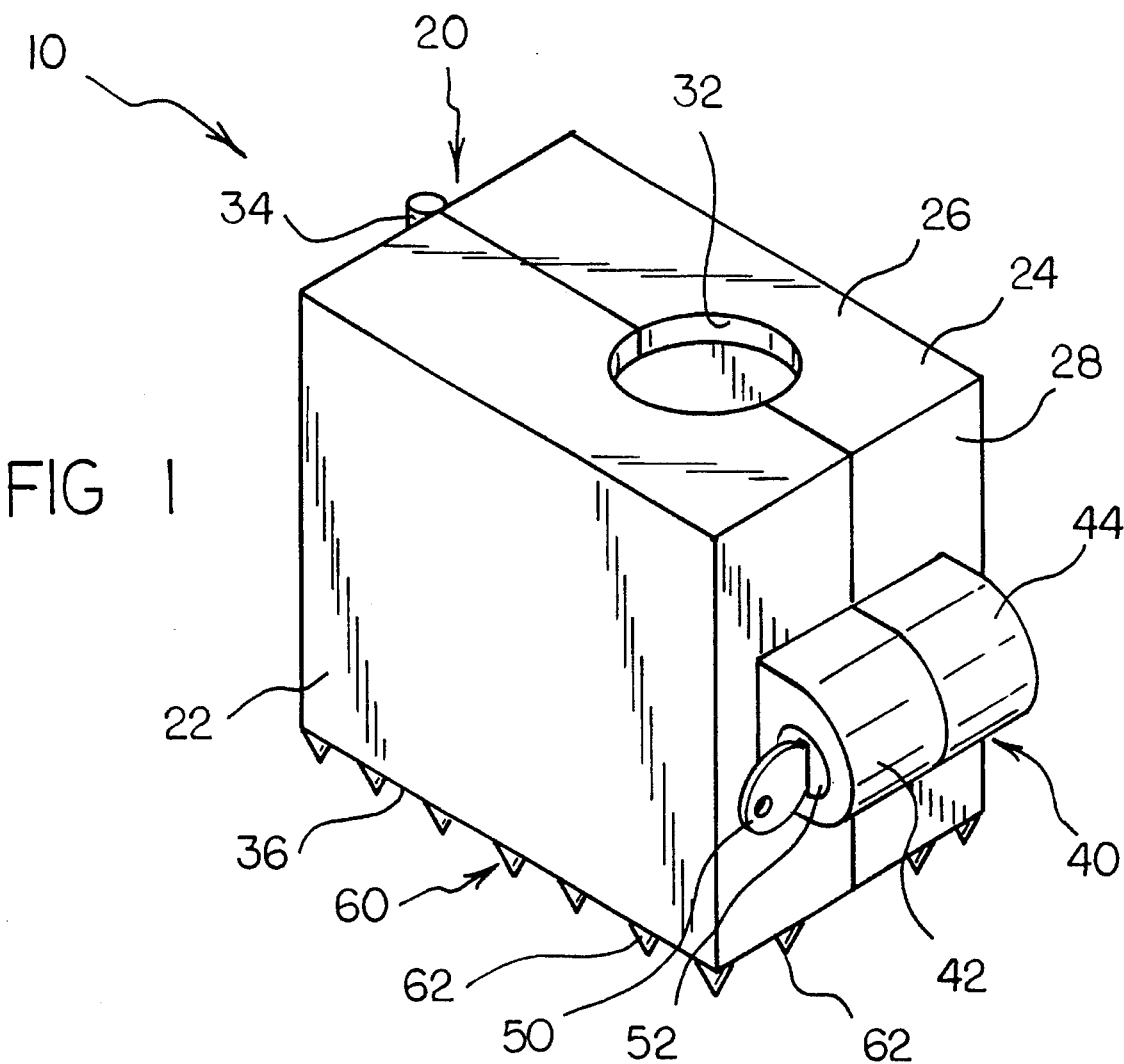
FIG. 1 is a perspective view of the new and improved wheel lock device.
Figure 2:
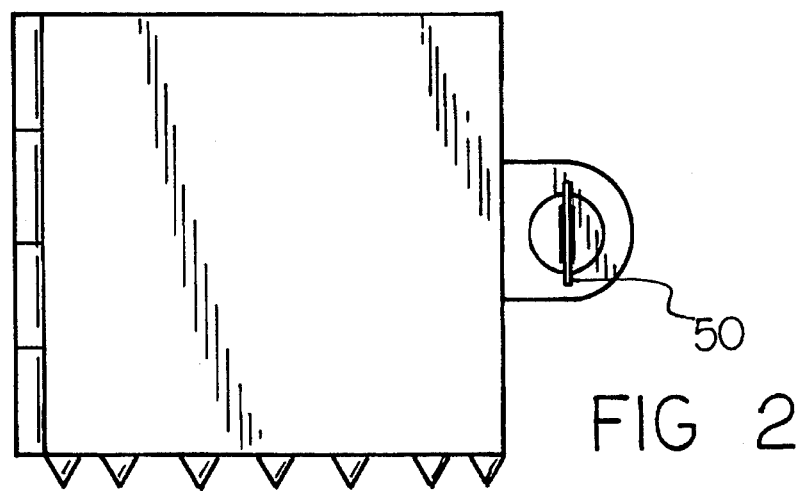
FIG. 2 is a side elevational view of the invention of FIG. 1.
Figure 5:
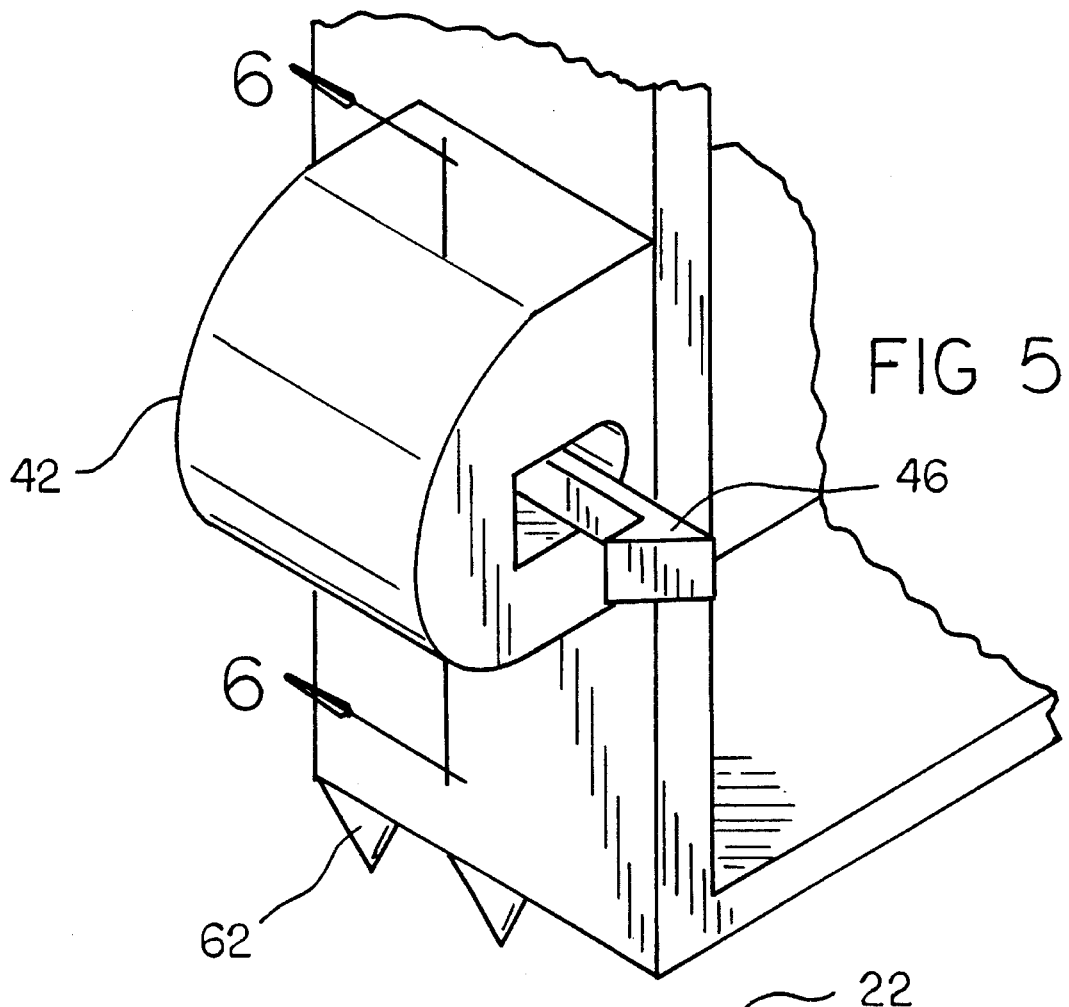
FIG. 5 is a detail view of the present invention illustrating the lock latch extending from the lock housing.
Figure 6:
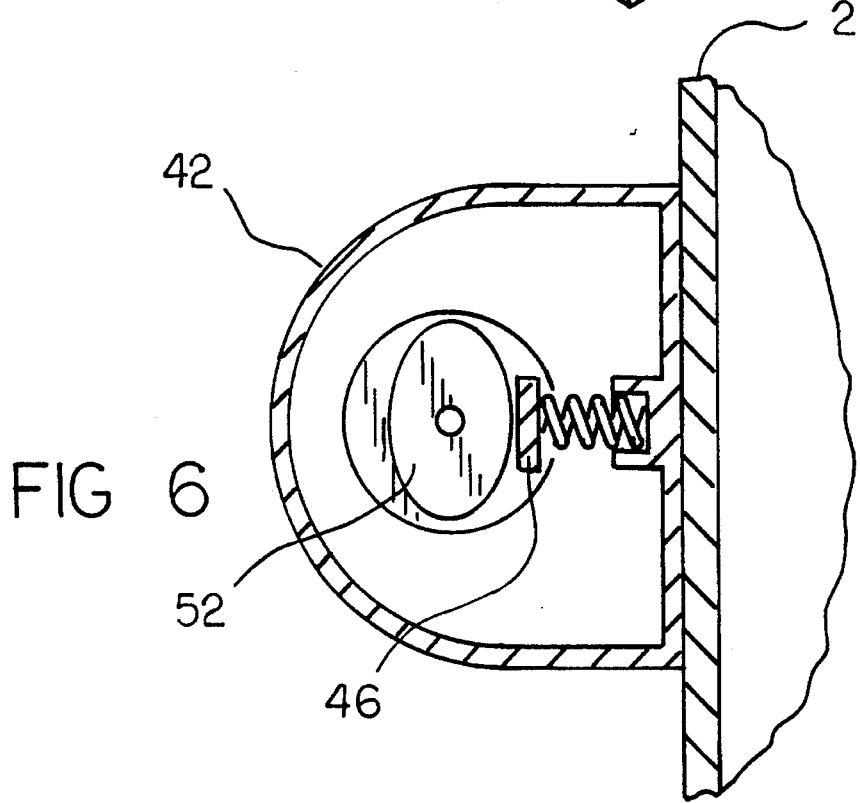
FIG. 6 is a sectional view of the invention of FIG. 5 showing the manner of operation of the rotary cam and biased latch.

With reference now to the drawings, and in particular to FIG. 1 thereof, a new and improved wheel lock device embodying the principles and concepts of the present invention and generally designated by the reference numeral 10 will be described.

Figure 7:
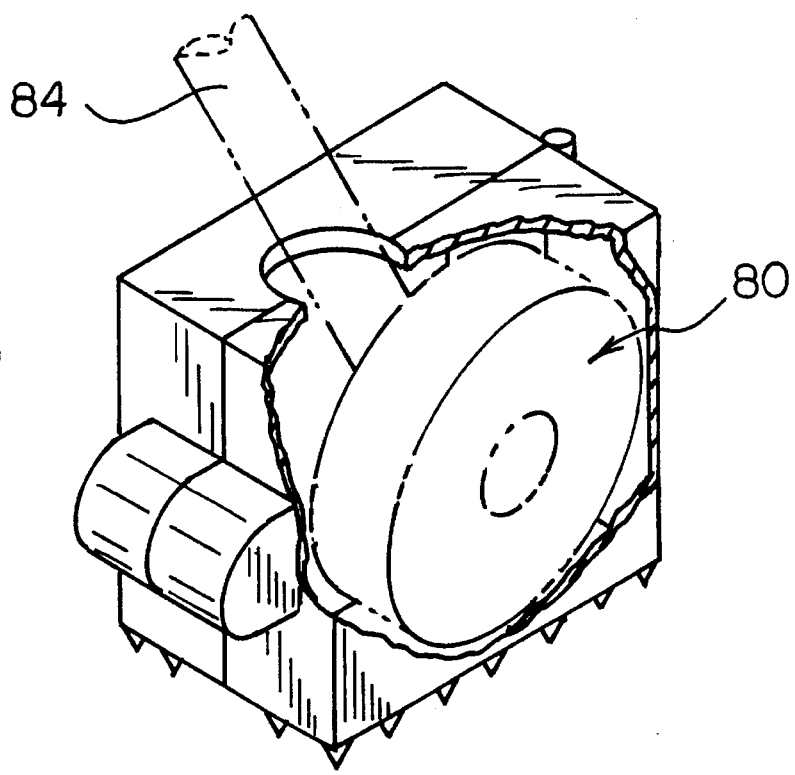
FIG. 7 is a perspective view of the present invention showing its manner of use with a single-wheel assembly.

From an overview standpoint, the wheel lock device is adapted for use for preventing unauthorized use of vehicles having strut-mounted wheels such as shopping carts, baby strollers, or aircraft. See FIG. 7.

With reference now to FIGS. 1–7 and more specifically, it will be noted that a new and improved wheel lock device 10 for preventing unauthorized use of vehicles having strut-mounted wheels such as shopping carts, baby strollers, or aircraft is shown and described.

The wheel lock device 10 comprises a shoe 20 having sides, a top 26, and a generally planar bottom 36. The shoe 20 has dimensions such that a strut-mounted wheel assembly 80 of a vehicle may be enclosed therein. The top 26 has a central aperture 32 wherethrough a wheel strut 84 may extend. The shoe 20 is separated vertically into two equal parts 22 and 24 which form complimentary halves of the shoe 20. The new wheel lock device 10 also has hinge means 34 pivotally connecting the two parts 22 and 24 of the shoe 20 along one side whereby the two parts 22 and 24 may be aligned in spread apart open relationship for receiving the wheel assembly 80.

The hinge means 34 also allows the two parts 22 and 24 of the shoe to be aligned in facing touching closed relationship for encasing the wheel assembly 80 whereby precluding free rotation along a supporting surface.

Locking means 40, whereby the two parts 22 and 24 of the shoe may be releasably secured in the closed position for preventing removal of the shoe 20 from the wheel assembly 80, is additionally included. The locking means 40 comprises a first housing 44 and a second housing 42. The housings 42 and 44 are integrally formed one on each of the parts 22 and 24 of the shoe 20. The housings 42 and 44 are externally formed on the side 28 of the shoe opposite the hinge 34.

The housings 42 and 44 are also in facing touching relationship with each other when the two parts 22 and 24 of the shoe 20 are aligned in the closed position. A catch 48 is formed in the first housing 44 wherein a latch may be releasably engaged. A biased latch 46 extends from the second housing 42 and is snapidly releasedly engaged with the catch 48 of the first housing 44 when the two parts 22 and 24 of the shoe 20 are aligned in the closed position.

The locking means 40 further comprises a key-actuated rotary cam 52 disposed within the second housing 42. The cam 52 is in cooperative communication with the latch 46 whereby rotation of the cam 52 overcomes the latch 46 bias to retract the latch 46 whereby releasing the latch 46 from engagement with the catch 48.

The device 10 additionally includes a key 50 removedly operationally connected to the rotary cam 52 whereby rotation of the key by a user causes the cam 52 to rotate whereby releasing the locking means 40 to permit the shoe 20 to be opened.

Lastly, the new and improved wheel lock device 10 has anti-slide means 60 for precluding the device 10 from sliding along the supporting surface thereby preventing unauthorized use of the vehicle. The anti-slide means 60 comprises a plurality of pointed cleats 62 disposed on the exterior bottom 36 of the shoe 20, the cleats 62 being in frictional engagement with the supporting surface.

Figure 8:
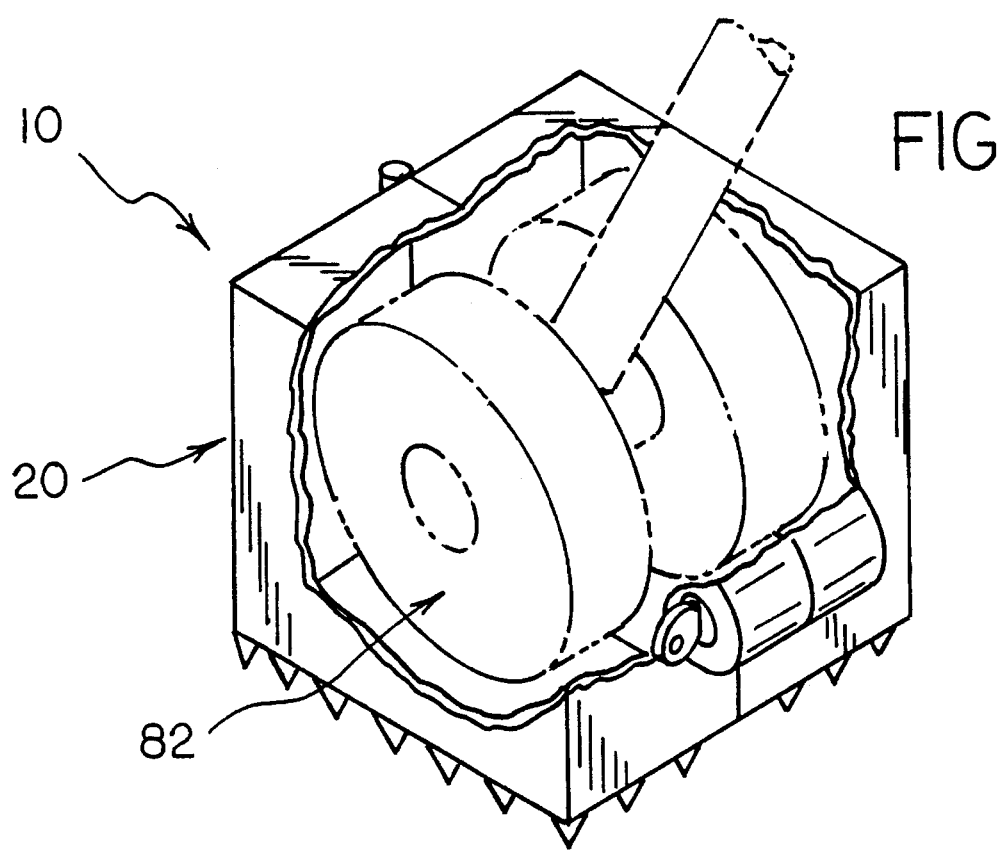
FIG. 8 is a perspective view of the present invention showing its manner of use with a dual-wheel assembly.

A modification of the new and improved wheel lock 10 is shown in FIG. 8 wherein the shoe 20 has a width to encase a dual-wheel assembly 82.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Now that the invention has been described,

What is claimed is:

1. A new and improved wheel lock device for preventing unauthorized use of vehicles having strut-mounted wheels, the wheel lock device comprising:

a shoe having sides, a top, and a bottom wherein a strut-mounted wheel assembly of a vehicle may be enclosed, the top having a central aperture therethrough wherethrough a wheel strut may extend, the shoe being separated vertically into two equal parts;

hinge means pivotally connecting the two parts of the shoe whereby the two parts may be aligned in spread apart open relationship for receiving the wheel assembly, the hinge means also allowing the two parts of the shoe to be aligned in facing touching closed relationship for encasing the wheel assembly whereby precluding free rotation along a supporting surface;

locking means whereby the two parts of the shoe may be releasably secured in the closed position for preventing removal of the shoe from the wheel assembly;

a key removedly operationally connected to the locking means whereby rotation of the key by a user releases the locking means so the shoe may be removed from the wheel assembly; and anti-slide means for precluding the wheel lock device from sliding along the supporting surface thereby preventing unauthorized use of the vehicle.

2. The wheel lock device of claim 1 wherein the bottom is generally planar.

3. The wheel lock device of claim 2 wherein the anti-slide means comprises a plurality of pointed cleats disposed on the exterior bottom of the shoe.

4. The wheel lock device of claim 3 wherein the locking means comprises a catch formed in one of the parts of the shoe wherein a latch may be releasably engaged; a biased latch extending from the other part of the shoe, the latch being snapidly releasedly engaged with the catch when the two parts of the shoe are aligned in the closed position; a key-actuated rotary cam in cooperative communication with the latch whereby rotation of the cam overcomes the latch bias to retract the latch whereby releasing the latch from engagement with the catch.

5. The wheel lock device of claim 4 wherein the key cooperates with the rotary cam whereby rotation of key causes the cam to rotate.

6. A new and improved wheel lock device for preventing unauthorized use of vehicles having strut-mounted wheels, the wheel lock device comprising:

a shoe having sides, a top, and a generally planar bottom, the shoe having dimensions such that a strut-mounted wheel assembly of a vehicle may be enclosed therein, the top having a central aperture therethrough wherethrough a wheel strut may extend, the shoe being separated vertically into two equal parts;

hinge means pivotally connecting the two parts of the shoe along one side whereby the two parts may be aligned in spread apart open relationship for receiving the wheel assembly, the hinge means also allowing the two parts of the shoe to be aligned in facing touching closed relationship for encasing the wheel assembly whereby precluding free rotation along a supporting surface;

locking means whereby the two parts of the shoe may be releasably secured in the closed position for preventing removal of the shoe from the wheel assembly, the locking means comprising a first housing and a second housing, the housings being integrally formed one on each of the parts of the shoe, the housings also being externally formed on a side of the enclosure opposite the hinge means, the housings further being in facing touching relationship when the two parts of the shoe are aligned in the closed position; a catch formed in the first housing wherein a latch may be releasably engaged; a biased latch extending from the second housing, the latch being snapidly releasedly engaged with the catch of the first housing when the two parts of the shoe are aligned in the closed position; and a key-actuated rotary cam disposed within the second housing, the cam being in cooperative communication with the latch whereby rotation of the cam overcomes the latch bias to retract the latch whereby releasing the latch from engagement with the catch;

a key removedly operationally connected to the rotary cam whereby rotation of the key by a user causes the cam to rotate whereby releasing the locking means to permit the shoe to be opened; and anti-slide means for precluding the wheel lock device from sliding along the supporting surface thereby preventing unauthorized use of the vehicle, the anti-slide means comprising a plurality of pointed cleats disposed on the exterior bottom of the shoe, the cleats being in frictional engagement with the supporting surface.

* * * * *